US007702699B2

(12) United States Patent
Vazquez et al.

(10) Patent No.: US 7,702,699 B2
(45) Date of Patent: *Apr. 20, 2010

(54) DYNAMIC DATA STREAM HISTOGRAMS FOR LARGE RANGES

(75) Inventors: Pedro Vazquez, Revel (FR); Alejandro Pablo Lopez, Isere (FR)

(73) Assignee: Oracle America, Inc., Redwood Shores, CA (US)

( * ) Notice: Subject to any disclaimer, the term of this patent is extended or adjusted under 35 U.S.C. 154(b) by 919 days.

This patent is subject to a terminal disclaimer.

(21) Appl. No.: 11/443,682

(22) Filed: May 31, 2006

(65) Prior Publication Data

US 2007/0282888 A1    Dec. 6, 2007

(51) Int. Cl.
*G06F 17/30* (2006.01)
*G06F 15/00* (2006.01)
*G06F 7/00* (2006.01)

(52) U.S. Cl. .................. 707/804; 702/180; 707/805
(58) Field of Classification Search .............. None
See application file for complete search history.

(56) References Cited

U.S. PATENT DOCUMENTS

| | | | | |
|---|---|---|---|---|
| 5,425,110 A * | 6/1995 | Spitz | ............ | 382/192 |
| 5,870,752 A * | 2/1999 | Gibbons et al. | ............ | 707/102 |
| 5,920,719 A * | 7/1999 | Sutton et al. | ............ | 717/130 |
| 6,865,567 B1 * | 3/2005 | Oommen et al. | ............ | 707/2 |
| 6,975,963 B2 * | 12/2005 | Hamilton et al. | ............ | 702/182 |
| 7,386,536 B1 * | 6/2008 | Ramesh et al. | ............ | 707/2 |
| 7,389,283 B2 * | 6/2008 | Adler | ............ | 707/2 |
| 2002/0198896 A1 * | 12/2002 | Chaudhuri et al. | ............ | 707/200 |
| 2004/0193629 A1 * | 9/2004 | Mozes | ............ | 707/100 |
| 2005/0091596 A1 * | 4/2005 | Anthony et al. | ............ | 715/712 |
| 2005/0190986 A1 * | 9/2005 | Sakurai | ............ | 382/275 |
| 2005/0240862 A1 * | 10/2005 | Palmer | ............ | 715/509 |
| 2006/0230083 A1 * | 10/2006 | Allyn et al. | ............ | 707/204 |
| 2007/0002075 A1 * | 1/2007 | Matsuda et al. | ............ | 345/592 |
| 2007/0078808 A1 * | 4/2007 | Haas et al. | ............ | 707/2 |
| 2007/0128611 A1 * | 6/2007 | Nelson et al. | ............ | 435/6 |
| 2007/0136317 A1 * | 6/2007 | Przywara | ............ | 707/100 |
| 2007/0233638 A1 * | 10/2007 | Carroll et al. | ............ | 707/2 |
| 2007/0288205 A1 * | 12/2007 | Vazquez et al. | ............ | 702/189 |
| 2008/0116093 A1 * | 5/2008 | Felten et al. | ............ | 206/316.2 |
| 2008/0208856 A1 * | 8/2008 | Lim et al. | ............ | 707/6 |
| 2008/0232669 A1 * | 9/2008 | Piper et al. | ............ | 382/133 |

OTHER PUBLICATIONS

Advanced School for Computing and Imaging, "Distributed Bucket Processing A paradigm for parallel image processing", Aug. 24, 2001, pp. 44, 65, 75, 77, 97, 103, 105, 124, 163-164.*

* cited by examiner

*Primary Examiner*—Neveen Abel Jalil
*Assistant Examiner*—Tarek Chbouki
(74) *Attorney, Agent, or Firm*—Osha•Liang LLP

(57) ABSTRACT

A method for creating a histogram from a plurality of data elements that includes specifying a plurality of internal buckets, wherein each internal bucket of the plurality of internal buckets represent values between an internal minimum value and an internal maximum value, wherein a plurality of differences of the internal minimum value and the internal maximum value of each internal bucket are heterogeneous, populating the plurality of internal buckets with the plurality of data elements based on the internal minimum value and the internal maximum value of each internal bucket to obtain a plurality of populated internal buckets, and outputting the histogram from the plurality of populated internal buckets.

10 Claims, 5 Drawing Sheets

DYNAMIC DATA STREAM HISTOGRAMS FOR LARGE RANGES

BACKGROUND

In the field of data mining, large amounts of discrete data must be analyzed. For example, in the field of weather modeling, precipitation can be represented as an amount of water molecules per unit of time (e.g., number of inches of rain per day). Researchers who study precipitation typically set multiple places of data sampling stations across the area for which the researcher is interested. Each discrete data point gathered at the data sampling station (i.e., a number representing the amount of water at a specific unit of time) is sent to a central computer at a configurable frequency. Based on all discrete data points, a researcher can forecast future precipitation. The more data points gathered, the greater likelihood that the forecast is correct. Accordingly, researchers gather large amounts of data in the form of discrete data points before making the forecast.

Multiple tools exist to help individuals understand large amounts of data. One such tool is the histogram. A histogram shows a relative frequency of elements or discrete data points within a data set. Specifically, a histogram shows how many elements fall within a certain external bucket. For example, suppose the data set represents the ages of individuals visiting a theme park. When representing the ages, external buckets of the ages, such as 0-4 years old, 5-9 years old, etc. are created. The histogram for the theme park shows the number of individuals having ages within the external buckets.

To construct a histogram, a complete data set is required. In particular, all elements are obtained before construction. Because the data set is complete, the histogram can give a more accurate representation of the data. For example, a histogram in which 99% of the elements are within a single external bucket is typically not helpful. However, with the complete data set, the external buckets can be distributed across the range of the data set to provide a more useful representation of data.

Often, a large volume of data is submitted as a data stream. Specifically, often a complete data set is not known prior to construction because data is constantly being sampled. In such scenarios, the complete data set is often stored in such a manner to maintain all information about each value of each data element. When a histogram is requested, then the histogram can be created using the complete data set as if the data set arrived at one time.

SUMMARY

In general, in one aspect, the invention relates to a method for creating a histogram from a plurality of data elements that includes specifying a plurality of internal buckets, wherein each internal bucket of the plurality of internal buckets represent values between an internal minimum value and an internal maximum value, wherein a plurality of differences of the internal minimum value and the internal maximum value of each internal bucket are heterogeneous, populating the plurality of internal buckets with the plurality of data elements based on the internal minimum value and the internal maximum value of each internal bucket to obtain a plurality of populated internal buckets, and outputting the histogram from the plurality of populated internal buckets.

In general, in one aspect, the invention relates to a system for creating a histogram from a data set that includes a plurality of data elements that includes a plurality of internal buckets, wherein each internal bucket of the plurality of internal buckets represent values between an internal minimum value and an internal maximum value, wherein a plurality of differences of the internal minimum value and the internal maximum value of each internal bucket are heterogeneous, and a histogram engine configured to populate the plurality of internal buckets with the plurality of data elements based on the internal minimum value and the internal maximum value of each internal bucket to obtain a plurality of populated internal buckets, and output the histogram from the plurality of populated internal buckets.

In general, in one aspect, the invention relates to a computer usable medium that includes computer readable program code embodied therein for causing a computer system to specify a plurality of internal buckets, wherein each internal bucket of the plurality of internal buckets represent values between an internal minimum value and an internal maximum value, wherein a plurality of differences of the internal minimum value and the internal maximum value of each internal bucket are heterogeneous, populate the plurality of internal buckets with the plurality of data elements based on the internal minimum value and the internal maximum value of each internal bucket to obtain a plurality of populated internal buckets, and output a histogram from the plurality of populated internal buckets.

Other aspects of the invention will be apparent from the following description and the appended claims.

DETAILED DESCRIPTION

Figure 1:
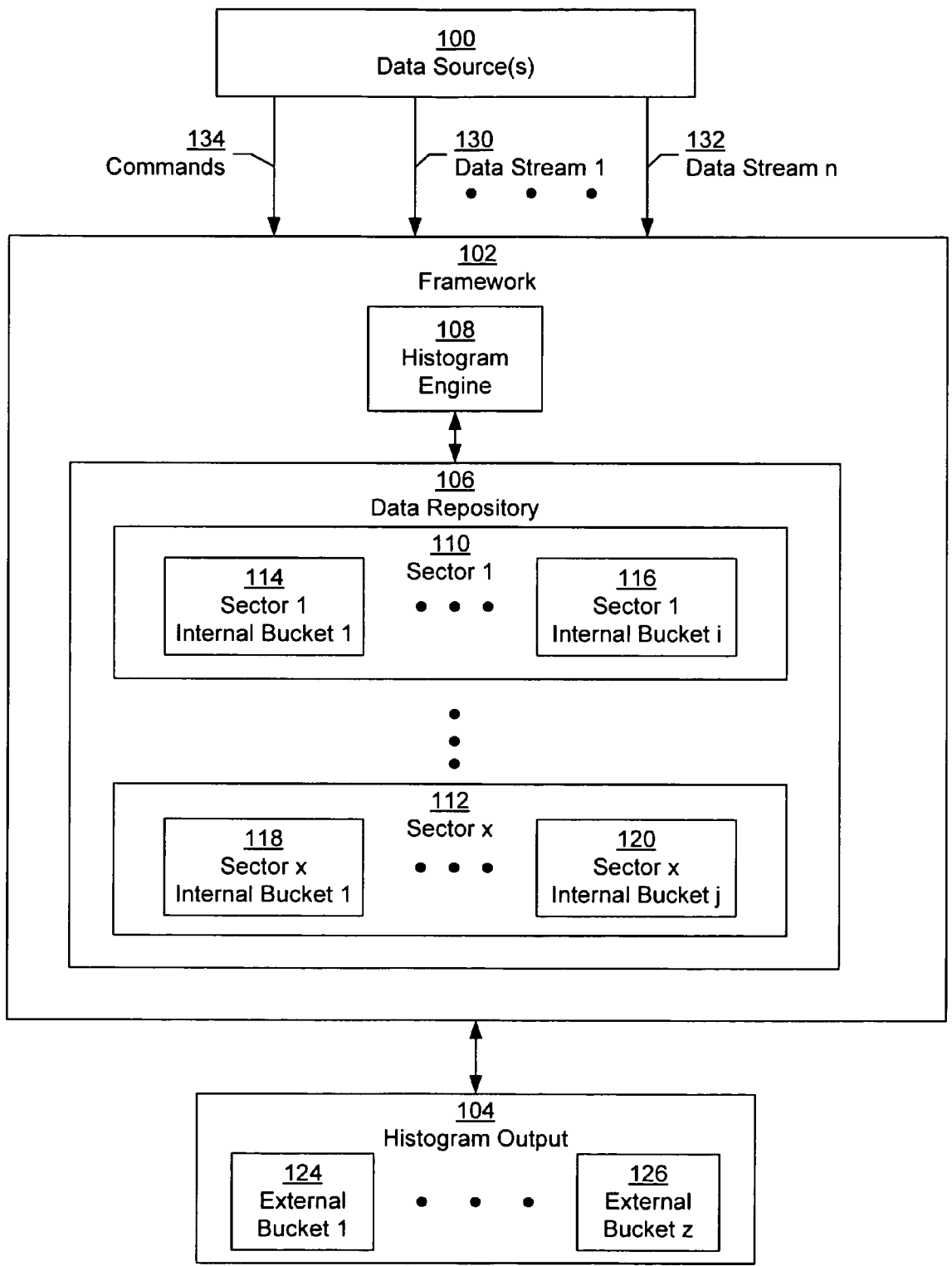
FIG. 1 shows a schematic diagram of a system for creating a histogram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for creating a histogram from a data stream in accordance with one or more embodiments of the invention. Specifically, embodiments of the invention provide a method and system for receiving data from a data stream, adding the data to an internal bucket, and outputting a histogram of external buckets based on values in the internal buckets.

More specifically, in one or more embodiments of the invention, the difference between the minimum value and the maximum value represented by each internal bucket is heterogeneous. Accordingly, the granularity of the information stored changes across the internal buckets. By maintaining information from the data stream with finer granularity in certain portions of the data set and courser granularity in other portions, a user can review with greater precision a portion of the histogram without having to store with fine granularity the uninteresting portion zoom in accordance with one or more embodiments of the invention.

For example, suppose a researcher wanted to study the temperature in a particular city during the summer months. On average, the temperature may range between 80 degrees Fahrenheit (° F.) and 100° F. around noon. In particular, the temperature is typically between 85° F. and 95° F. However, on certain occasions, the temperature is below 80° F. and above 100° F. When studying the temperature for the particular city, the researcher is more interested at the focus (i.e. between 85° F. and 95° F.) and less interested as the values are farther from the middle value.

Accordingly, in the example, as the distance to the focus (e.g., the difference between the values represented by an internal bucket and the focus) increases, the granularity represented by the internal buckets decreases. For example, a single middle internal bucket may be for a range representing 85.1700° F.-85.1799° F., whereas another internal bucket may represent the range 60° F.-81° F., and another internal bucket may represent the range between 50° F.-60° F. By maintaining information with greater precision for the data elements near the focus and information with less precision for values farther from the middle, the researcher may view a histogram with greater detail in the focus and not store in such high precision, the uninteresting data elements in accordance with one or more embodiments of the invention.

FIG. 1 shows a schematic diagram of a system for creating a histogram in accordance with one or more embodiments of the invention. As shown in FIG. 1, the system includes data source(s) (100), a framework (102), and histogram output (104). Each of these components is described below.

A data source (100) corresponds to any type of mechanism that includes functionality to transmit data. For example, a data source may correspond to a sampling device that includes functionality to capture and transmit data, a computer, a person that inputs data, or any other source. Further, multiple data sources of a variety of types may exist. In one or more embodiments of the invention, a data source (100) transmits data over duration of time. Specifically, in accordance with one or more embodiments of the invention, the capturing of data is continual. Thus, the data source includes functionality to transmit data in the form of data streams (e.g., data stream 1 (130), data stream n (132)).

A data stream (e.g., data stream 1 (130), data stream n (132)) corresponds to a series of data. Those skilled in the art will appreciate that the data stream may not be continuous. Specifically, a data stream may be interrupted and/or transmitted only for duration of time in which data is captured. Further, in one or more embodiments of the invention, the data stream (e.g., data stream 1 (130), data stream n (132)) may correspond to a series of numerical values captured with a variety of precisions. For example, some data elements sent on the data stream may have values with digits tenth (e.g., 87.3, 9232.8, etc), while other data elements may have only whole number values (e.g., −1, 8, 3, etc.).

In addition to a data stream (e.g., data stream 1 (130), data stream n (132)), a data source (100) also includes functionality to transmit commands (134) in accordance with one or more embodiments of the invention. A command (134) corresponds to any type of request. For example, a command may correspond to a command for initializing data collection or for specifying parameters to create the histogram. Those skilled in the art will appreciate that a separate data source (100) may transmit the commands (134) while a different data source (100) that includes functionality to transmit data. Further, the data source (100) may be of heterogeneous types. For example, the data source to transmit commands may correspond to a person, while the data source for transmitting data may correspond to a sampling station.

Continuing with FIG. 1, the data source (100) is connected to a framework (102). Specifically, in one or more embodiments of the invention, the data source (100) includes functionality to transmit data directly or indirectly to the framework (102). The framework (102) corresponds to a component that includes functionality to receive data and commands from the data stream, store data, and create a histogram. In one or more embodiments of the invention, the framework (102) includes a data repository (106) and a histogram engine (108). The data repository (106) and the histogram engine (108) are described below.

A data repository (106) corresponds to a storage unit, such as physical memory locations, database, vector, etc. for storing data from the data stream (e.g., data stream 1 (130), data stream n (132)). In particular, the data repository includes multiple sectors (e.g., sector 1 (110), sector x (112)). Each sector (e.g., sector 1 (110), sector x (112)) represents a range of possible values for data from the data stream.

Moreover, each sector (e.g., sector 1 (110), sector x (112)) represents a disjoint range of values in accordance with one or more embodiments of the invention. For example, sector 1 (110) may represent the range of values that are less than one hundred, while sector x (112) represents the range of values between one hundred and five hundred, etc. Further, in one or more embodiments of the invention, the differences between the minimum value and the maximum value of each sector (e.g., sector 1 (110), sector x (112)) may or may not be heterogeneous. For example, sector 1 (110) may have a difference between the minimum value and the maximum value may be fifty, while the difference between the minimum value and the maximum value for sector x (112) may be one thousand.

Furthermore, in one or more embodiments of the invention, each sector (e.g., sector 1 (110), sector x (112)) is divided evenly into internal buckets (e.g., sector 1—internal bucket 1 (114), sector 1—internal bucket i (116), sector x—internal bucket 1 (118), sector x—internal bucket j (120)). An internal bucket (e.g., sector 1—internal bucket 1 (114), sector 1—internal bucket i (116), sector x—internal bucket 1 (118), sector x—internal bucket j (120)) corresponds to a container for holding specific data values in accordance with one or more embodiments of the invention. Specifically, each internal bucket (e.g., sector 1—internal bucket 1 (114), sector 1—internal bucket i (116), sector x—internal bucket 1 (118), sector x—internal bucket j (120)) represents possible values for data elements that are between a minimum value and a maximum value.

In accordance with one or more embodiments of the invention, each internal bucket (e.g., sector 1—internal bucket 1 (114), sector 1—internal bucket i (116), sector x—internal bucket 1 (118), sector x—internal bucket j (120)) corresponds to a counter for the data values. In particular, the value of the internal bucket represents the number of data elements from the data stream(s) (e.g., data stream 1 (130), data stream n (132)) that have values within the minimum value and the maximum value for the bucket.

In one or more embodiments of the invention, the difference between the minimum value and the maximum value for each internal bucket in a single sector is the same. Further, the difference between the minimum value and the maximum value for internal buckets in different sectors may vary. For example, the difference between the minimum value and the maximum value for internal buckets (e.g., sector 1—internal bucket 1 (114), sector 1—internal bucket i (116)) within sector 1 (110) may be different than the differences between the minimum value and the maximum value for internal buckets (e.g., sector x—internal bucket 1 (118), sector x—internal bucket j (120)) within sector x (112). Thus, sector 1 (110) may include internal buckets with a precision of one-tenth (i.e., the difference between the minimum value and the maximum value for internal buckets within sector 1 (110) is 0.10), whereas the sector x (112) may include internal bucket having a precision of one-thousandth in accordance with one or more embodiments of the invention.

Typically, internal buckets near a focus have greater precision than the internal buckets away from the focus in accordance with one or more embodiments of the invention. The focus corresponds to a range of values in which the user is most likely interested. Thus, in one or more embodiments of the invention, the data stream is maintained with a "fish-eye" perspective.

Continuing with FIG. 1, the framework (102) also includes a histogram engine (108). A histogram engine (108) corresponds to a logical component that includes functionality to receive and interpret commands (134), store the data from the data stream (e.g., data stream 1 (130), data stream n (132)) into the correct internal bucket (e.g., sector 1—internal bucket 1 (114), sector 1—internal bucket i (116), sector x—internal bucket 1 (118), sector x—internal bucket j (120)), and create the histogram output (104).

The histogram output (104) corresponds to the any type of histogram representation of the data in the internal buckets (e.g., sector 1—internal bucket 1 (114), sector 1—internal bucket i (116), sector x—internal bucket 1 (118), sector x—internal bucket j (120)). For example, the histogram output (104) may be graphical, numerical, etc. Within the histogram output (104) are multiple external buckets (e.g., external bucket 1 (124), external bucket z (126)). In one or more embodiments of the invention, each external bucket (e.g., external bucket 1 (124), external bucket z (126)) is a counter corresponding the sum of one or more internal buckets (e.g., sector 1—internal bucket 1 (114), sector 1—internal bucket i (116), sector x—internal bucket 1 (118), sector x—internal bucket j (120)). In one or more embodiments of the invention, an external bucket (e.g., external bucket 1 (124), external bucket z (126)) may represent the sum of internal buckets spanning a part of a sector, a sector, or more than one sector.

Figure 2:
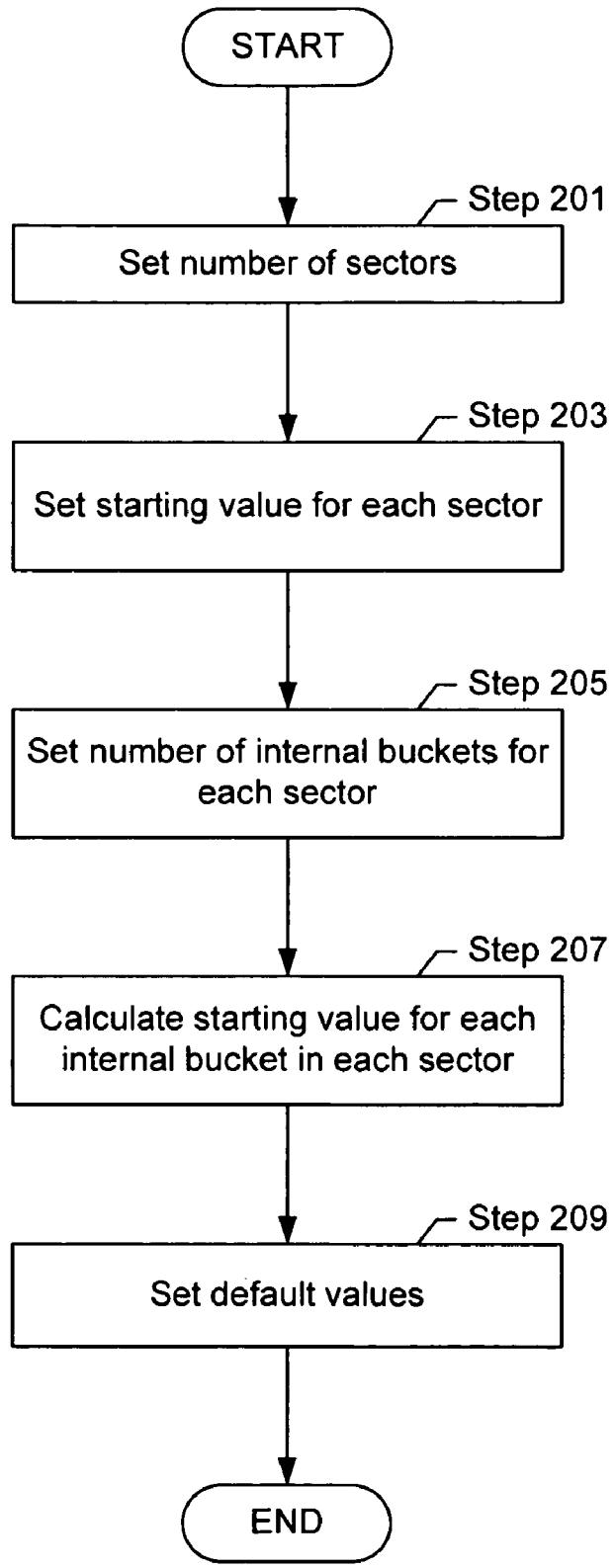
FIG. 2 shows a flowchart of a method for configuring the framework to create the histogram from a data stream in accordance with one or more embodiments of the invention.

Before the histogram output is created, the framework is configured in accordance with one or more embodiments of the invention. FIG. 2 shows a flowchart of a method for configuring the framework to create the histogram from a data stream in accordance with one or more embodiments of the invention.

Initially, the number of sectors is set (Step 201). Specifically, the number of sectors may correspond to the number of different granularities to be maintained. More specifically, because buckets in neighboring sectors represent possible values with different precision, for each change in precision, a new sector is identified. Thus, in accordance with one or more embodiments of the invention, the number of sectors may be set according to the desired number of changes in granularity.

Using the number of sectors, the staffing value for each sector is set (Step 203). In one or more embodiments of the invention, the starting value corresponds to the minimum represented value for the sector. Accordingly, the starting value corresponds to the value in which a change in precision is desired. Thus, the starting value for each sector may be calculated and/or set by a user.

After setting the starting value for each sector is set, the number of internal buckets for each sector is set (Step 205). The number of internal buckets may be set according to the precision for the sector. For example, if the sector is to have a precision in which the difference between the minimum value and the maximum value of a bucket is one hundred and the minimum value for the sector is zero and the maximum value for the sector is nine hundred ninety-nine, then the number of internal buckets may be set at ten. In another example, if the sector is to have a precision of one-tenth and the minimum value and the maximum value is the same as the previous example, then the number of internal buckets may be set to ten thousand.

Next, the starting value for each internal bucket is calculated (Step 207) in accordance with one or more embodiments of the invention. In one or more embodiments of the invention, the size of each internal bucket in the same sector is the same. Accordingly, calculating the starting value for the internal bucket may be performed using techniques well known in the art for calculating evenly spaced starting values across the range.

Alternatively, if the internal buckets are not evenly spaced across a sector, then calculating the starting value of each internal bucket may be performed according to configuration parameters or a specification from a user.

Continuing with FIG. 2, default values may also be set (Step 209). Default values may correspond to values for the number of external buckets, a maximum and minimum value for the histogram output, or any other such parameters. At this stage, in one or more embodiments of the invention, the data source may specify default values for creating the histogram output, the default values may be a part of a program of the histogram engine, etc.

Figure 3A:
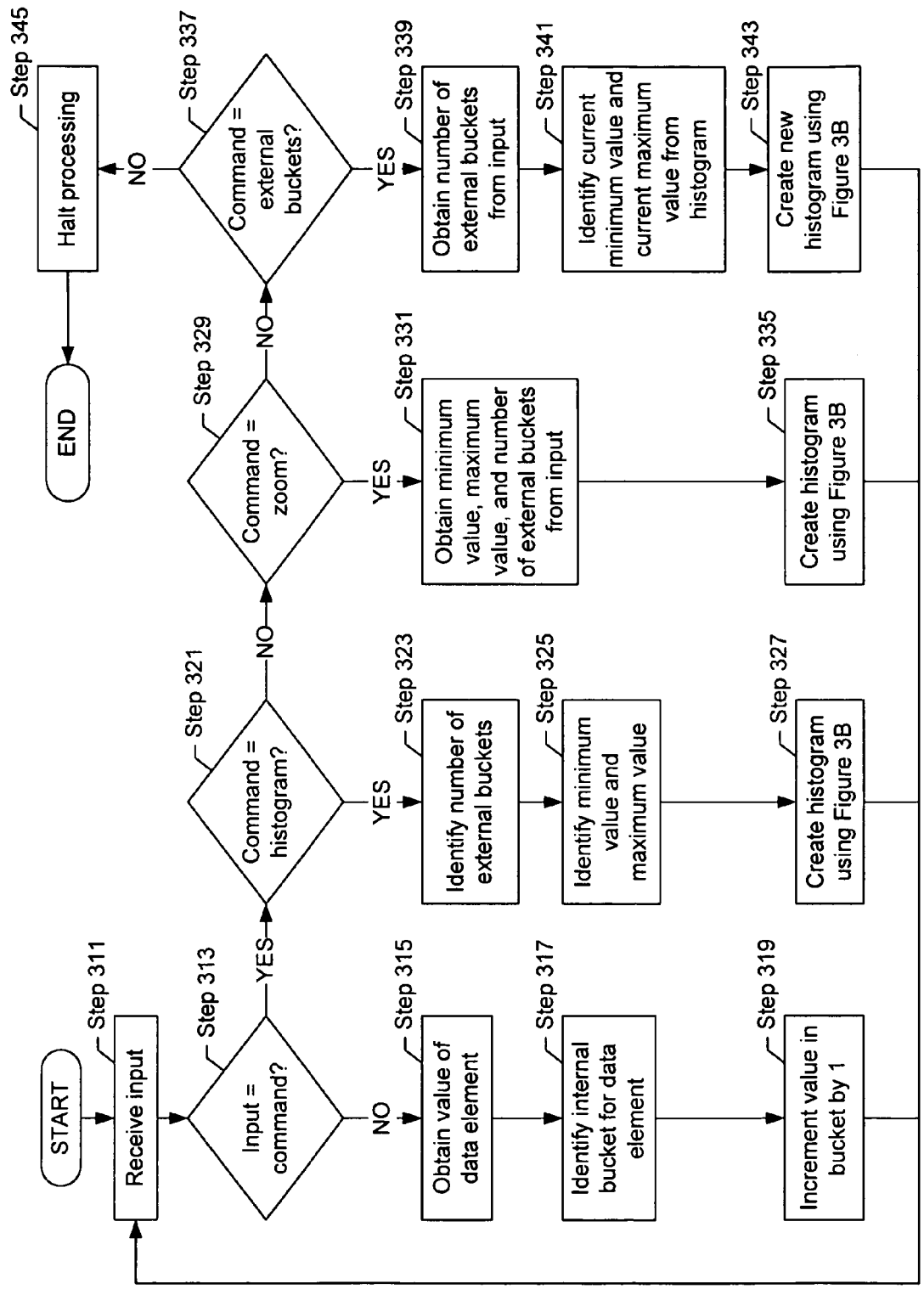
FIGS. 3A-3B shows a flowchart of a method for creating a histogram from a data stream in accordance with one or more embodiments of the invention.
Figure 3B:
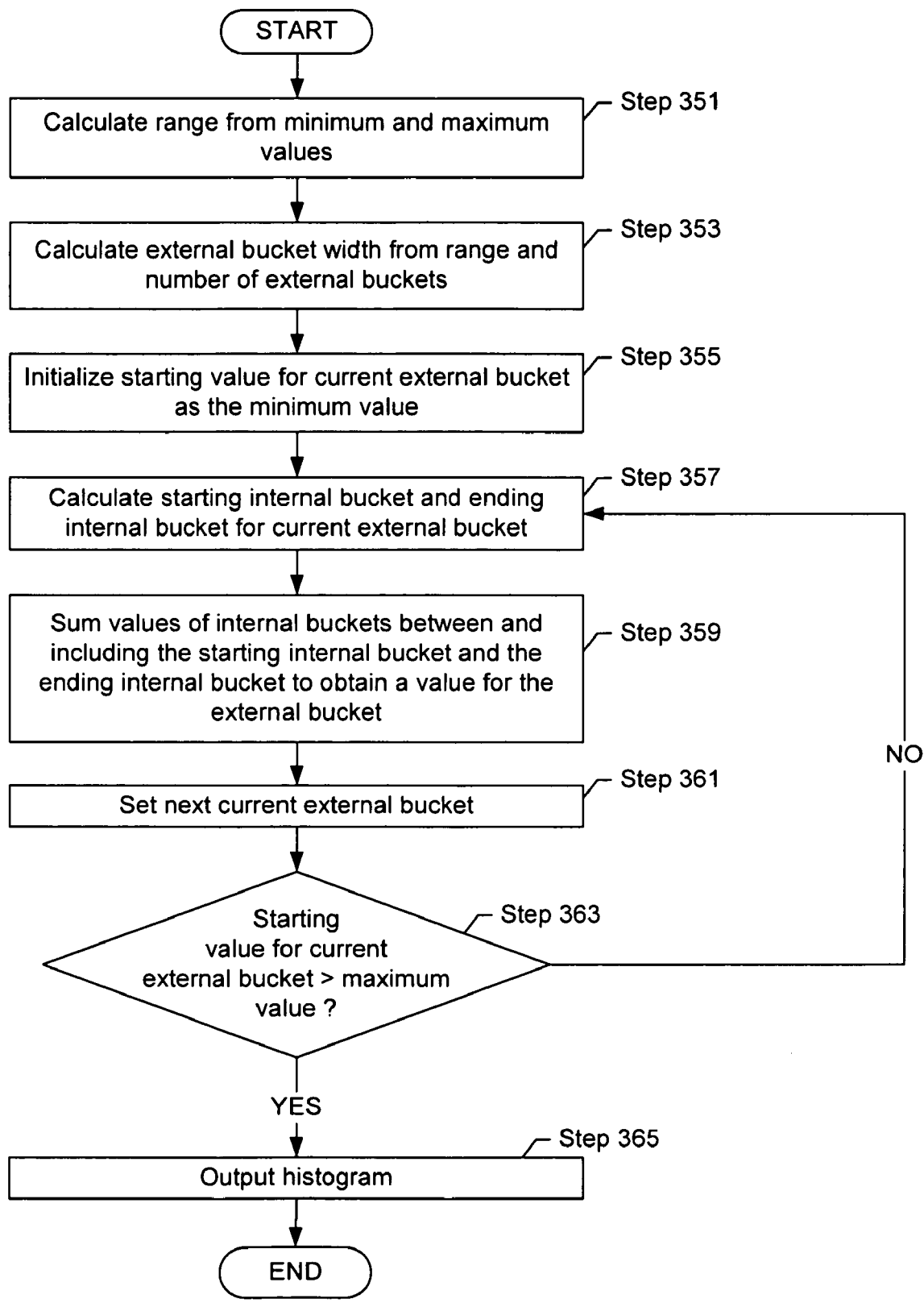

Once the framework is configured, then data may be received from the data source and the histogram can be created. FIGS. 3A-3B shows a flowchart of a method for creating a histogram from a data stream in accordance with one or more embodiments of the invention. Specifically, FIG. 3A shows a flowchart of a method for processing input.

Initially, input is received (Step 311). The receiving of input may be performed using techniques well known in the art. For example, input may be sent as a message from the data source and processed according to the type of message. Further, in one or more embodiments of the invention, input is continually being received in the form of separate data elements or commands. Accordingly, each data element and/or individual command may be processed individually in accordance with one or more embodiments of the invention.

Once the input is received, then a determination is made whether the input is a command (Step 313). If the input is not a command, then the input is most likely a data element in accordance with one or more embodiments of the invention. Thus, the value of the data element is obtained (Step 315). At this stage, the value of the data element may be obtained directly from the input. For example, the data stream upon which the input arrives may include input in the form of values of data elements in a sequence (e.g. 4.86, 3.40984, 7832.29, etc.). Each data element corresponds to individual input. Those skilled in the art will appreciate that multiple optimization mechanisms exist to enhance performance. For example, multiple data elements may be received from the data stream and processed in parallel.

Continuing with FIG. 3A, the internal bucket is identified for the data element (Step 317). In particular, the internal bucket may be identified using the value of the data element.

Identifying the internal bucket may include identifying calculating the internal bucket that represents a particular range of values in which the value of the data element is within. For example, consider the case in which the value of the data element is 5.509. An internal bucket may exist that represents the range between 5.489 and 6.893. Accordingly, the internal bucket is identified as the internal bucket for the data element.

Those skilled in the art will appreciate that multiple mechanisms exists for identifying the internal bucket may be performed. For example, the sector that represents the range of values in which the value of the data element corresponds may be first identified. From the sector, and based on the precision of the sector, the internal bucket may be identified.

After identifying the internal bucket, the value in the internal bucket is incremented by one (Step 319). Specifically, a counter in the internal bucket may be incremented. Thus, the internal bucket represents the number of data elements that are received from the data stream and fall within the range represented by the internal bucket. Further, because the internal bucket tracks the number of elements within a range of values, the data element is only processed once. After the data element is processed, then the method may continue with receiving more input from the data stream (Step 311).

Continuing with FIG. 3A, if alternatively, the input is a command, then a determination is made whether the command is to create a histogram (Step 321). Specifically, in accordance with one or more embodiments of the invention, the command may be to create a histogram using default values. Accordingly, the number of external bucket is identified (Step 323). The number of external buckets may be identified the default values. Also at this stage, the minimum and maximum value for the histogram output is identified. The minimum and maximum value may be set as default values, set according to the range of the values of the data elements from the data stream (e.g., the minimum and maximum value of the data elements from the data stream, that 90% of the values are represented by the histogram output, etc.). Once the number of external buckets, the minimum value, and the maximum value is identified, then the histogram can be created using FIG. 3B (Step 327) and described below.

Alternatively, if the command is not to create a histogram, then the command may be to zoom into an existing histogram output. Accordingly, a determination is made whether the command is to zoom (Step 329). If the command is to zoom, then the minimum value, the maximum value, and the number of external buckets is obtained from the input in accordance with one or more embodiments of the invention (Step 331). Specifically, the aforementioned values may be obtained as input parameters with the command to zoom. More specifically, by specifying the aforementioned values, the data source specifies how much to zoom and which portion of the histogram is of interest. Typically, the focus, as discussed above, will receive the most zoom in requests. Specifically, a user is most likely interested in the data elements at the focus.

Accordingly, in one or more embodiments of the invention, because the internal buckets are configured to provide greater precision around the focus, the framework provides for the user to zoom more into the focus than in other positions of the histogram. After obtaining the minimum value, the maximum value, and the number of external buckets, the histogram may be created using FIG. 3B as described below.

Alternatively, if the command is not to zoom into an existing histogram, than the command may be to provide greater granularity with an existing histogram. Accordingly, a determination is made whether the command is for specifying external buckets (Step 337). If the command is for specifying the number of external buckets, then the number of external buckets is obtained from the input. Typically, the number of external buckets may be specified as input parameters in the command.

At this stage, the number of external bucket requested may be checked against the maximum number of external buckets that are possible given the range. In particular, in one or more embodiments of the invention, the command may not be for requesting greater granularity in the external buckets than the granularity provided by the internal buckets. Moreover, at most, a one-to-one correspondence may exist between the internal buckets and the external buckets in accordance with one or more embodiments of the invention.

Also, at virtually any time before creating the new histogram output, the current minimum value and maximum value are identified from the existing histogram (Step 341). In one or more embodiments of the invention, the current minimum value and maximum value may be retained with each creation of a histogram. Accordingly, by accessing the retained values, the current minimum value and the current maximum value can be identified.

Once the current minimum value, maximum value and the number of buckets are obtained, then the histogram may be created using FIG. 3B in accordance with one or more embodiments of the invention.

If as an alternative, the command is not for increasing the granularity of an existing histogram, then the command is to halt processing (Step 345) in accordance with one or more embodiments of the invention. For example, the command may specify that the current values in the internal buckets should be erased, or that the framework will not receive more commands and therefore may relinquish memory.

As discussed above, once at least some of the data elements are processed, and after obtaining or identifying the minimum value, maximum value, and number of buckets to create the histogram, the histogram may be created in accordance with one or more embodiments of the invention. FIG. 3B shows a flowchart of a method for creating a histogram in accordance with one or more embodiments of the invention.

Initially, the range is calculated from the minimum value and the maximum value (Step 351). The range may be calculated by subtracting the maximum value from the minimum value in accordance with one or more embodiments of the invention.

After calculating the range, the external bucket width is calculated from the range and the number of external buckets (Step 353). Specifically, the external bucket width may be calculated, for example, by dividing the range by the number of external buckets. Alternatively, if the external bucket width is variable between buckets, then the external bucket width for each external bucket may be calculated or specified by the input parameters.

Next, the starting value for the current external bucket is initialized to the minimum value (Step 355). Specifically, at this stage the current external bucket corresponds to the external bucket that represents the lowest range of values.

Also at this stage, the starting internal bucket and the ending internal bucket is calculated for the current external bucket (Step 357). Calculating the starting internal bucket and the ending internal bucket may be performed by using the starting value for the current external bucket. Next, the internal bucket that represents the starting value is set as the starting internal bucket.

Similarly, the ending internal bucket may be performed by adding the external bucket width to the starting value for the external bucket. The resulting sum is the ending value for the current external bucket. Accordingly, the internal bucket that represents the ending value is identified.

In one or more embodiments of the invention, for at least some of the external buckets, the starting value and/or the ending value does not correspond to the minimum value or maximum value for any of the internal buckets. Specifically, the granularity of the internal buckets may preclude obtaining an exact number of data elements that have values between the starting value and the ending value for the external buckets. Accordingly, in such cases, a variety of heuristics may be used to estimate the number of data elements that have values between the starting value and ending value for the external bucket.

Continuing with FIG. 3B, after calculating the starting internal bucket and the ending internal bucket for the current external bucket, the values of the internal buckets between and including the starting internal bucket and ending internal bucket are summed to obtain the value for the current external bucket (Step 359). Specifically, the values in each internal bucket that represents values of data elements between the starting value and ending value for the current external bucket are totaled in accordance with one or more embodiments of the invention. Moreover, the totaling of the values may be performed regardless of the sector of the internal buckets. The resulting value is set in the current external bucket as the total number of data elements that have been received from the data stream having values between the starting value and the ending value for the current external bucket.

Once the value for the current external bucket is obtained, the next current external bucket is set (Step 361). Specifically, at this stage, the ending value for the previous external bucket is set as the starting value for the next external bucket. Those skilled in the art will appreciate that setting the ending value as the starting value may be performed so as to avoid overlap in accordance with one or more embodiments of the invention.

After setting the starting value for the current external bucket, a determination is made whether the starting value is greater than the maximum value for the histogram (Step 363). If the starting value is greater than the maximum value than more external buckets exist. Thus, in one or more embodiments of the invention, the method repeats with calculating the starting internal bucket and the ending internal bucket (Step 357) (described above).

Alternatively, if the starting value for the current external bucket is greater than the maximum value, then most likely all external buckets for the histogram have values. Thus, the histogram is outputted (Step 365). Outputting the histogram may be performed in virtually any manner using techniques known in the art. For example, the starting value, ending value, and value of the external bucket for each external bucket may be outputted to a file, graphical output, etc.

Those skilled in the art will appreciate that while FIG. 3B shows creating the histogram starting with the external bucket that represents the lowest range of values of data elements, the value in each external bucket may be calculated in virtually any order. Specifically, the value for any external bucket may be calculated by identifying the starting internal bucket and the ending internal bucket for the external bucket, and totaling the values between the starting internal bucket and the ending internal bucket.

Those skilled in the art will appreciate that while FIG. 3B shows one method for creating a histogram from the internal buckets, other methods may also exist.

Figure 4:
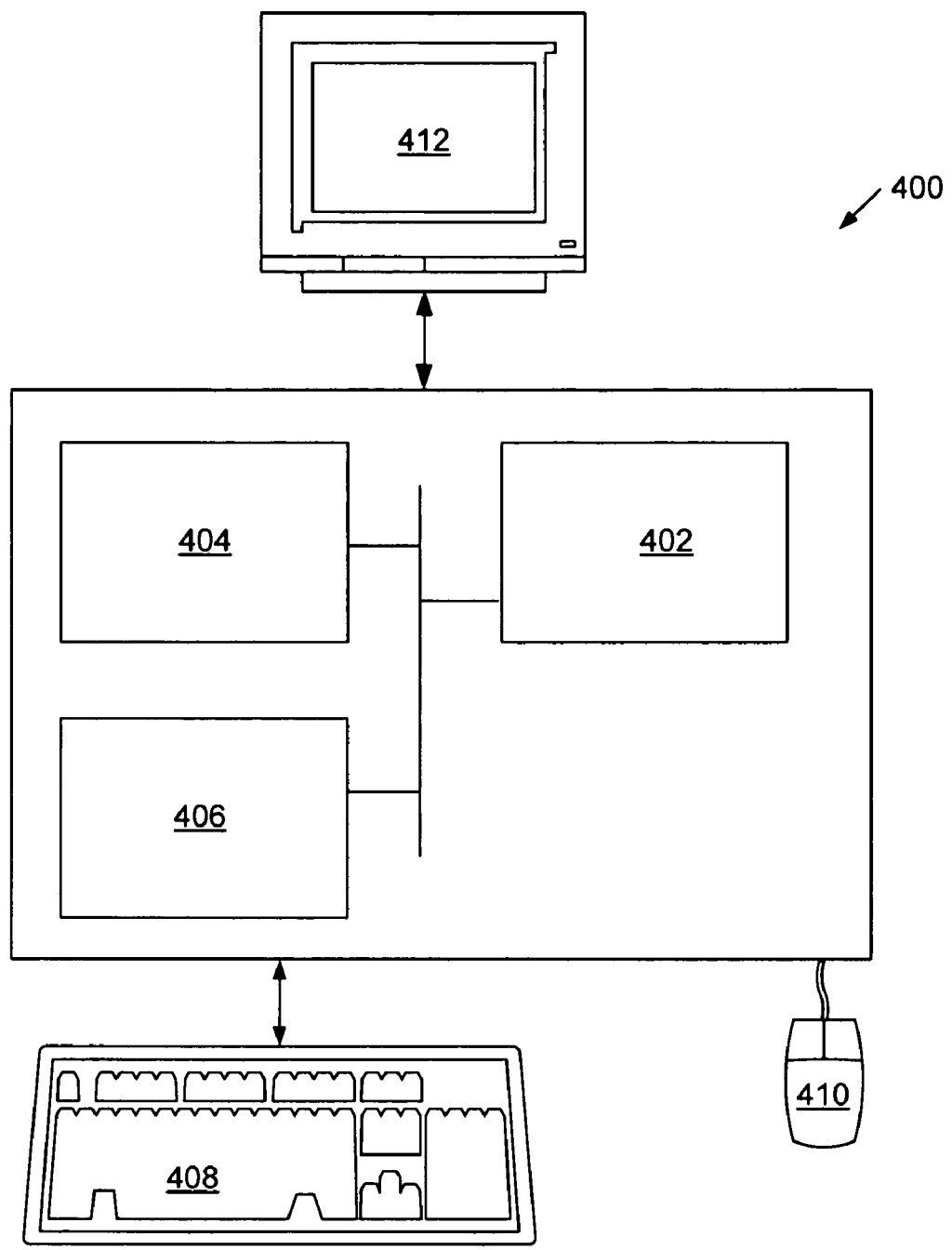
FIG. 4 shows a computer system in accordance with one or more embodiments of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer (400) may also include input means, such as a keyboard (408) and a mouse (410), and output means, such as a monitor (412). The computer system (400) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (400) may be located at a remote location and connected to the other elements over a network. Further, the invention may be implemented on a distributed system having a plurality of nodes, where each portion of the invention (e.g., histogram engine, data sources, histogram output, internal buckets, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

Embodiments of the invention provide a mechanism for constructing a histogram from a data stream by reviewing the values of the data elements only once. Specifically, by maintaining the information in internal buckets, the amount of memory and processing time to create the histogram is minimized. Further, embodiments of the invention, maintain greater precision around the focus while minimizing the amount of memory and processing time required. Accordingly, the histogram having finer granularity can be created around the focus of the data set.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for creating a histogram from a data set comprising a plurality of data elements, comprising:
   a processor;
   a plurality of internal buckets, wherein each internal bucket of the plurality of internal buckets represent values between an internal minimum value and an internal maximum value, wherein a plurality of differences of the internal minimum value and the internal maximum value of each internal bucket are heterogeneous; and
   a histogram engine configured to be executed by the processor to:
     populate the plurality of internal buckets with the plurality of data elements based on the internal minimum value and the internal maximum value of each internal bucket to obtain a plurality of populated internal buckets; and
     create the histogram comprising a plurality of external buckets, wherein each of the plurality of external buckets comprises a total sum of at least two of the plurality of populated internal buckets,
   wherein creating the histogram comprises:
     identifying a minimum value and a maximum value for the plurality of data elements, calculating a range according to the minimum value and the maximum value, dividing the range into the plurality of external buckets, for each of the plurality of external buckets:
- calculating a staffing internal bucket of the plurality of internal buckets and an ending internal bucket of the plurality of internal buckets for each of a plurality of external buckets using the range,
- summing each value of a subset of the plurality of internal buckets between the staffing internal bucket and ending internal bucket to create a total sum, and
- outputting the total sum, wherein calculating the staffing internal bucket and the ending internal bucket is based on a number of the plurality of external buckets and the range, wherein the number of the plurality of external buckets is determined from a parameter in a command to create the histogram.

2. The system of claim 1, wherein each of the plurality of internal buckets comprises a counter.

3. The system of claim 2, wherein the histogram engine is further configured to:
- identify an internal bucket in the plurality of internal buckets according to the scope represented by the internal bucket for each of the plurality of data elements; and
- increment the counter associated with the internal bucket.

4. The system of claim 1, wherein the histogram engine is further configured to:
- receive the plurality of data elements continually from a network,
- wherein the plurality of internal buckets are populated while the plurality of data elements are received.

5. The system of claim 1, wherein the maximum value and the minimum value are determined from at least one parameter in a command to create the histogram.

6. A computer usable storage medium comprising computer readable program code embodied therein for causing a computer system to perform a method, the method comprising:
- specifying a plurality of internal buckets, wherein each internal bucket of the plurality of internal buckets represent values between an internal minimum value and an internal maximum value, wherein a plurality of differences of the internal minimum value and the internal maximum value of each internal bucket are heterogeneous;
- populating the plurality of internal buckets with a plurality of data elements based on the internal minimum value and the internal maximum value of each internal bucket to obtain a plurality of populated internal buckets; and
- creating a histogram comprising a plurality of external buckets, wherein each of the plurality of external buckets comprises a total sum of at least two of the plurality of populated internal buckets, wherein creating the histogram comprises:
- identifying a minimum value and a maximum value for the plurality of data elements,
- calculating a range according to the minimum value and the maximum value,
- dividing the range into the plurality of external buckets,
- for each of the plurality of external buckets:
  - calculating a staffing internal bucket of the plurality of internal buckets and an ending internal bucket of the plurality of internal buckets,
  - summing each value of a subset of the plurality of internal buckets between the staffing internal bucket and ending internal bucket to create a total sum, and
  - outputting the total sum, wherein calculating the staffing internal bucket and the ending internal bucket is based on a number of the plurality of external buckets and the range, wherein the number of the plurality of external buckets is determined from a parameter in a command to create the histogram.

7. The computer usable storage medium of claim 6, wherein populating the plurality of internal buckets comprises:
- identifying a internal bucket in the plurality of internal buckets according to the scope represented by the internal bucket for each of the plurality of data elements; and
- incrementing a counter associated with the internal bucket.

8. The computer usable storage medium of claim 6, wherein the maximum value and the minimum value are determined from at least one parameter in a command to create the histogram.

9. The computer usable storage medium of claim 6, wherein each of the plurality of internal buckets comprises a counter.

10. The computer usable storage medium of claim 6, the method further comprising:
- receiving the plurality of data elements continually from a network,
- wherein the plurality of internal buckets are populated while the plurality of data elements are received.

* * * * *

UNITED STATES PATENT AND TRADEMARK OFFICE
CERTIFICATE OF CORRECTION

| | | |
|---|---|---|
| PATENT NO. | : 7,702,699 B2 | Page 1 of 1 |
| APPLICATION NO. | : 11/443682 | |
| DATED | : April 20, 2010 | |
| INVENTOR(S) | : Pedro Vazquez et al. | |

It is certified that error appears in the above-identified patent and that said Letters Patent is hereby corrected as shown below:

In the claims, claim 1, column 11, line 5, the word "staffing" should read as -- starting --;

In the claims, claim 1, column 11, line 10, the word "staffing" should read as -- starting --;

In the claims, claim 1, column 11, line 14, the word "staffing" should read as -- starting --;

In the claims, claim 6, column 12, line 14, the word "staffing" should read as -- starting --;

In the claims, claim 6, column 12, line 18, the word "staffing" should read as -- starting --;

In the claims, claim 6, column 12, line 22, the word "staffing" should read as -- starting --.

Signed and Sealed this

Tenth Day of August, 2010

David J. Kappos
*Director of the United States Patent and Trademark Office*